(12) United States Patent
Ohki et al.

(10) Patent No.: US 6,339,638 B1
(45) Date of Patent: Jan. 15, 2002

(54) TELEPHONE USED FOR ELECTRONIC MONEY CARD TRANSACTION AND METHOD OF OPERATION OF THE SAME

(75) Inventors: Masayuki Ohki; Atsuhiko Urushibara; Jun Furuya, all of Kokubunji; Shigeyuki Ito, Kawasaki; Hiroki Kitagawa, Tokyo; Takao Oosawa, Niiza, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/453,032

(22) Filed: Dec. 2, 1999

Related U.S. Application Data

(63) Continuation of application No. 08/758,819, filed on Dec. 4, 1996.

(30) Foreign Application Priority Data

Dec. 8, 1995 (JP) ............................................. 7-320646

(51) Int. Cl.⁷ ............................................. H04M 11/00
(52) U.S. Cl. ............................... 379/91.01; 379/93.12; 379/428.03; 235/380
(58) Field of Search ........................... 379/90.01, 91.01, 379/93.01–93.03, 93.12, 93.17, 93.23, 100.04, 110.01, 144, 357; 705/39–44; 235/379–380

(56) References Cited

U.S. PATENT DOCUMENTS

| | | | |
|---|---|---|---|
| 4,906,828 A | * 3/1990 | Halpern | 235/379 |
| 4,926,325 A | * 5/1990 | Benton et al. | 379/100.04 |
| 5,175,416 A | 12/1992 | Mansvelt et al. | 235/379 |
| 5,221,838 A | 6/1993 | Gutman et al. | 235/379 |
| 5,222,122 A | 6/1993 | Hamilton et al. | 379/102.01 |
| 5,434,395 A | * 7/1995 | Storck et al. | 235/380 |
| 5,655,008 A | * 8/1997 | Futch et al. | 379/91.01 |
| 5,691,525 A | * 11/1997 | Aoki et al. | 235/379 |
| 6,000,607 A | * 12/1999 | Ohki et al. | 235/379 |

FOREIGN PATENT DOCUMENTS

| | | | |
|---|---|---|---|
| JP | 7-212504 | 8/1995 | H04M/17/02 |
| WO | WO 90/07756 | 7/1990 | G07F/7/10 |

* cited by examiner

*Primary Examiner*—Sinh Tran
*Assistant Examiner*—George Eng
(74) *Attorney, Agent, or Firm*—Mattingly, Stanger & Malur, P.C.

(57) ABSTRACT

A telephone for transferring electronic money between money cards has on the top thereof two card inlets of two internal card reader/writers, a display window, a ten-key set used to dial a telephone number or enter an amount of electronic money transaction, telephone function keys, and mode selection keys. It can be operated to transfer electronic money between two money cards inserted in the card inlets, or between a money card inserted in one of the card inlets and another money card linked through the telephone line, thereby enabling person-to-person, person-to-bank, and person-to-retailer transactions based on electronic money.

3 Claims, 12 Drawing Sheets

TELEPHONE USED FOR ELECTRONIC MONEY CARD TRANSACTION AND METHOD OF OPERATION OF THE SAME

This is a continuation application of U.S. Ser. No. 08/758,819, filed Dec. 4, 1996.

BACKGROUND OF THE INVENTION

1. Field of the Invention

The present invention relates to a telephone used for an electronic money transaction system, and particularly to a telephone which is useful for carrying out the monetary settlement based on electronic money between IC cards which can store electronic money, and to a method of operation of the same.

2. Description of the Prior Art

In recent years, there has been proposed an electronic money transaction system for transferring electronic money based on the communication between IC cards which can store electronic money. The IC card used in this system includes a microprocessor having a communication function and a memory, e.g., EEEPROM, for storing a processing program and the balance of electronic money. The IC card can be used for electronic money transaction with other IC cards through the electronic money transaction system which includes terminals installed in banks, retail stores, individual residences, etc. linked by a communication line, or by using dedicated IC card terminals.

The above-mentioned electronic money transaction system is still at the stage of development, with its constituent devices being left indeterminate for their functions and configurations.

SUMMARY OF THE INVENTION

An object of the present invention is to provide a telephone and a method of operation of the same which are useful for the above-mentioned electronic money transaction system, and are capable of transferring electronic money between money cards, e.g., the person-to-person, person-to-bank and person-to-retailer transactions, based on the telephone communication function, while protecting the money card user from illegal withdrawal of money.

Another object of the present invention is to provide a telephone and a method of operation of the same which are capable of transferring electronic money between two pieces of money cards coupled to the telephone, or between one or both of two pieces of money cards coupled to the telephone and other money cards linked through the telephone line.

Still another object of the present invention is to provide a telephone having card inlets which allow easy access for the insertion and ejection of money cards and having a convenient telephone top layout which allows easy distinction between the telephone function and electronic money transfer function.

In order to achieve the above objectives, the invention resides in a telephone used for an electronic money transaction system for transferring electronic money between money cards which can store electronic money, the telephone including two money card reader/writers so that electronic money is transferred between two pieces of money cards inserted in the card inlets of the two money card reader/writers.

In order to achieve the above objectives, the inventive telephone has its one card inlet located at the top rear position of the telephone main body so that one money card is inserted vertically and its another card inlet located at the front side of the telephone main body so that another money card is inserted horizontally.

In order to achieve the above objectives, the invention resides in a telephone which includes a display window, a ten-key set located in front of the display window, telephone function keys located on one side of the ten-key set, electronic money function keys located on another side of the ten-key set, a money card reader/writer having a card inlet located above the display window and adapted to insert a money card vertically, and another money card reader/writer having a card inlet located below the ten-key set and adapted to insert a money card horizontally.

In order to achieve the above objectives, the invention resides in a method of operation of the telephone, the method including a step of determining the transfer direction between money cards coupled to multiple money card reader/writers equipped in the telephone, or a step of selecting one of the multiple money card reader/writers thereby to implement electronic money transfer between a money card coupled to the selected money card reader/writer and other money card linked through the telephone line.

In order to achieve the above objectives, the inventive telephone operation method includes an operational mode of electronic money transfer between money cards coupled to multiple money card reader/writers equipped in the telephone, and an operational mode of electronic money transfer between a money card coupled to selected one of the money card reader/writers and other money card linked through the telephone line.

DESCRIPTION OF THE PREFERRED EMBODIMENTS

Figure 1:
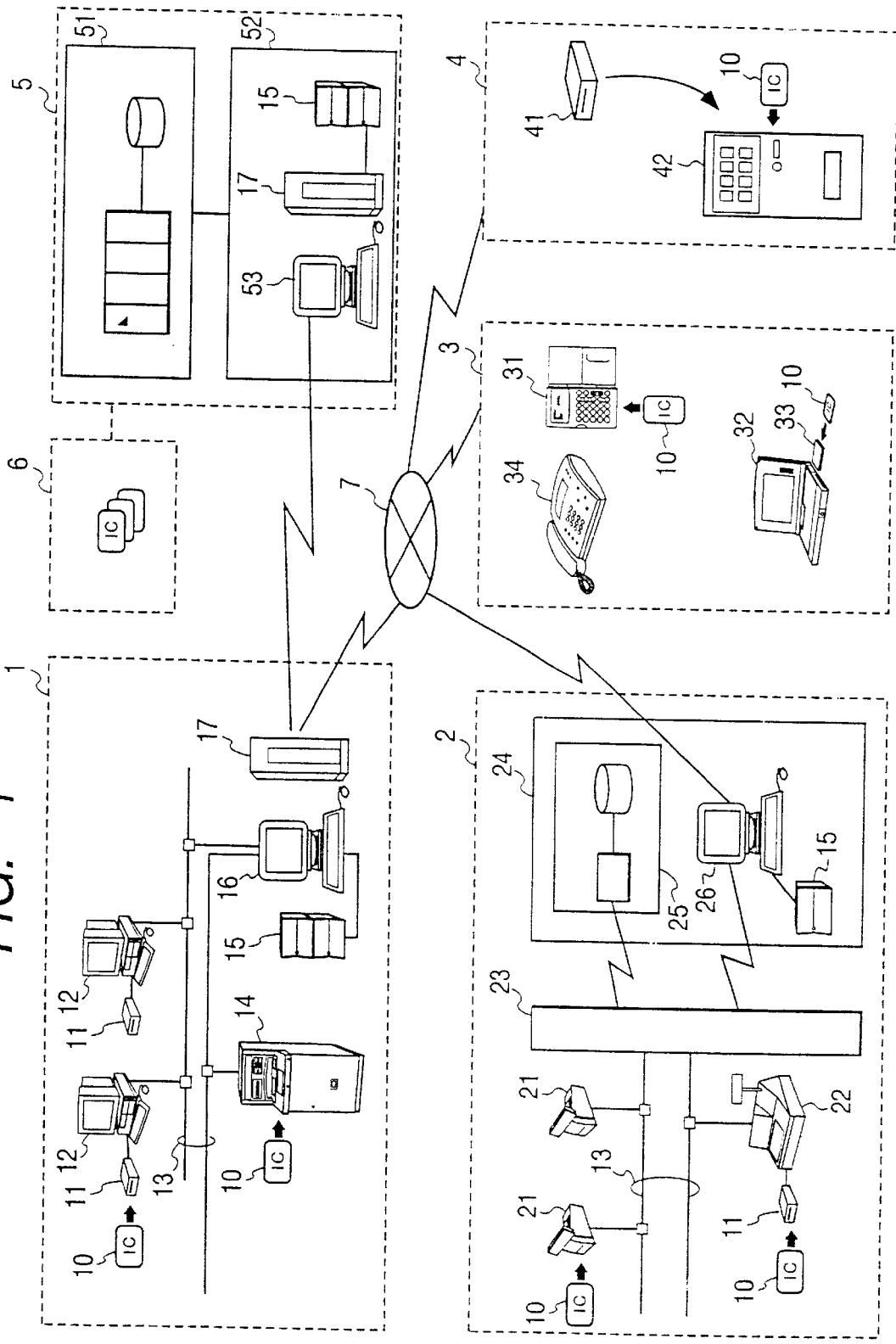
FIG. 1 is a block diagram of the electronic money transaction system to which the present invention is applied.

The telephone for an electronic money transaction system based on an embodiment of this invention will be explained in detail with reference to the drawings.

The electronic money transaction system in which the inventive telephone is used will first be explained with reference to FIG. 1. In the figure, reference numeral 1 denotes a bank branch system, 2 is a retail store system, 3 is an individual user system, 4 is a vending machine system, 5 is a bank computing center, 6 is an electronic money originator, 7 is a public communication network, 10 is an IC card, 11 is an external IC card reader/writer unit, 12 is a banking teller terminal,13 is an internal communication line, 14 is an auto-teller machine (ATM), 15 is a value box, 16 is an electronic money transaction control terminal, 17 is a relay computer, 21 is an electronic money POS terminal, 22 is other POS terminal, 23 is a store controller, 24 is a center facility, 25 is a value control/management system, 26 is a work station, 31 is an electronic wallet, 32 is a personal computer, 33 is a PC-type card reader/writer, 34 is a telephone,41 is a built-in IC card reader/writer, 42 is a vending machine, 51 is a host accounting system, 52 is an external accounting system, and 53 is an external system control terminal.

The electronic money transaction system shown in FIG. 1 is made up of the bank branch system 1, retail store system 2 installed in a large retail dealer such as a supermarket, individual user system 3 including the personal computer 32 and IC telephone 34 all linked through the public communication network 7, and the vending machine system 4 is linked to the network 7 through card read/writer 41. Although shown in FIG. 1 are one set of several kinds of systems, it is possible to organize a plurality of these systems linked through the public communication network 7. The bank branch system 1 also has a direct connection through the leased line to the bank computing center 5, which is connected to the electronic money originator 6.

IC cards 10, each including a microprocessor with a communication function and a memory, e.g., EEEPROM, for storing a processing program and the balance of electronic money, are possessed by individual users, banks, retail stores, vending machines, etc. that are members of the electronic money transaction system.

The bank branch system 1, which already has the connection with the existing banking teller terminals 12 and ATMs 14 through the internal communication line 13 and the connection with the bank computing center 5 by way of the relay computer 17, is further provided with IC card reader/writer units 11 attached to the banking teller terminals 12 and an IC card reader/writer built in the ATM 14 and is connected with the value box 15 by way of the electronic money transaction control terminal 16 so as to carry out the monetary settlement of electronic money.

The bank computing center 5 includes a host accounting system 51 and external accounting system 52, which includes an external system control terminal 53, relay computer 17 and value box 15.

The retail store system 2, with its POS terminals being generally connected to the center facility 24 through the internal communication line 13 by way of the store controller 23, is further provided with IC card reader/writer units 11 attached to the POS terminals 22 or provided with electronic money POS terminals 21. The center facility 24 includes a value control/management system 25, work station 26 and value box 15.

The user system 3 which mainly supports an individual user can be as simple as only an electronic wallet 31 with the ability of displaying the balance of electronic money stored in the IC card and possibly with an additional calculator function. In addition, the user's personal computer 32 has the provision of a PC-type IC card reader/writer 33 so that it is connected to the public communication network 7. The user can also use the telephone 34 which can handle IC cards. The user's personal computer 32 and telephone 34 with the provision of two IC card reader/writers can perform the electronic money transfer between two pieces of IC cards, and it becomes possible, for example, to transfer electronic money from the husband's IC card to the wife's IC card.

The vending machine system 4 includes a vending machine 42 having a built-in IC card reader/writer 41.

Next, the method of use of the electronic money transaction system arranged as described above to which this invention is applied will be explained.

The electronic money originator 6 distributes IC cards 10 to banks, retail stores, vending machines and individual users that are members of the system. The bank receives electronic money in exchange for currency, and stores the electronic money in the value box 15 in the external accounting system 52. The value box 15 stores many IC cards, as will be explained later, to which electronic money received from the electronic money originator 6 is distributed and stored. Electronic money stored in the IC cards in the value box 15 of the external accounting system 52 is distributed to IC cards in the value box 15 of the bank branch system 1.

Each individual member (user) of the electronic money transaction system possesses a distributed IC card 10. The user draws one's deposit of bank account in the form of electronic money and stores it in one's IC card 10 by using the banking teller terminals 12 or ATM 14 in the bank branch system 1. The user connects one's personal computer 32 equipped with the PC-type IC card reader/writer 33 or one's telephone 34 to the bank branch system 1 through the communication network 7, and can convert the deposit account money into electronic money and store it in one's IC card 10.

At the drawing of electronic money, the user's IC card is linked based on its communication function to a specific IC card in the value box 15 of the bank branch system 1 by way of the banking teller terminal 12, ATM 14, personal computer 32, or telephone 34. Electronic money stored in the IC card 10 of the value box 15 of the bank branch system 1 is transferred and stored in the user's IC card 10. At the same time, the balance of electronic money stored in the IC card in the value box 15 of the bank branch system 1 is subtracted by the amount of electronic money transferred to the user's IC card 10. The drawing of deposits of bank accounts of individuals is the same as the convention.

It is also possible for the user to convert currency into electronic money and store it in one's IC card at the bank or IC card originator, instead of drawing the deposit of bank account explained above.

Electronic money stored in the user's IC card can be transferred back to the IC card in the value box 15 of the bank branch system 1 by way of the banking teller terminal 12, ATM 14 or personal computer 32 so that it is deposited in the user's bank account.

The user having electronic money stored in one's IC card as explained above can use the IC card to buy goods and services in retail stores that are members of the system. Specifically, for example, the IC card user who intends to buy goods brings the things to the POS terminal counter in the retail store. The clerk operates the POS terminal 21 or 22 to read the barcode label of each thing thereby to enter its price and total the prices of all things, and charges the total price to the customer. The customer who intends to pay for the goods with the IC card puts the card into the card inlet of the electronic money POS terminal 21 or the IC card reader/writer unit 11 attached to the usual POS terminal 22.

The user's IC card is linked to the relevant IC card in the value box 15 in the center facility 24 of the retail store by way of the work station 26 over the internal communication line 13. Electronic money in the user's IC card is transferred to the IC card in the value box 15 of the center facility 24, and the POS terminal issues a receipt to complete the transaction process. Electronic money in the user's IC card is subtracted by the amount of payment, and it is added to electronic money in the IC card of the retail store.

Different from the foregoing case of a retail store having a number of POS terminals and a value box in the center facility 24 for storing many IC cards, a small retail shop having only a cash register has the installation of an IC card reader/writer and has a shop's IC card for the cash register, thereby allowing customers to pay with their IC cards through the linkage to the shop's IC card by the IC card reader/writer. Electronic money stored in the shop's IC card can be deposited to the bank account or can also be cashed at the the bank.

As a manner of organizing a retail store system having POS terminals, these terminals are provided with individual IC that transactions with customer's IC cards are carried out temporarily based on the IC cards of POS terminals, and the contents of IC cards are transferred from the POS terminals to the IC cards in the value box 15 of the center facility 24 afterward when necessary.

The vending machine 42 included in the electronic money transaction system is provided with the IC card reader/writer 41 built in the machine and its own IC card so that transaction is carried out with a customer's IC card coupled to the reader/writer 41 by the customer.

Figure 2:
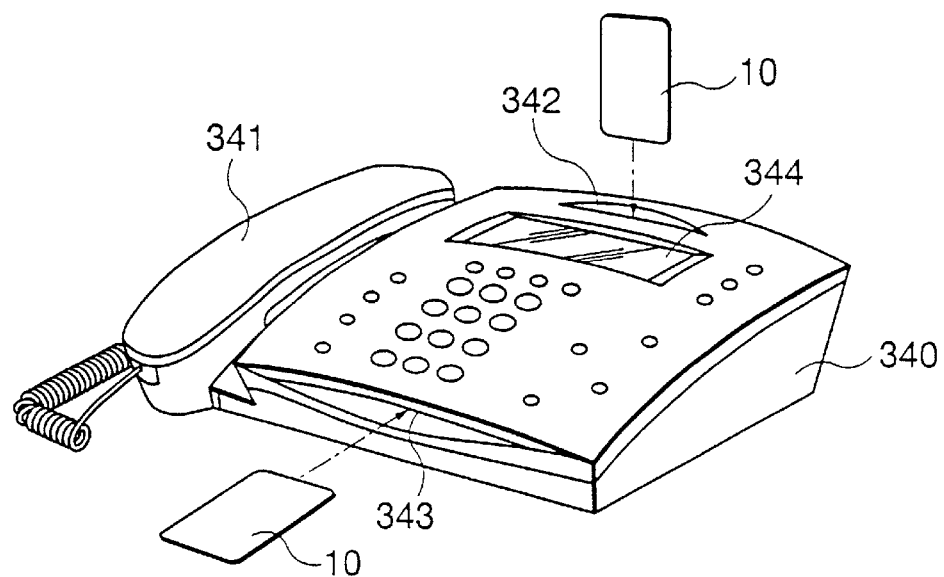
FIG. 2 is a perspective view of the telephone based on an embodiment of this invention.
Figure 3:
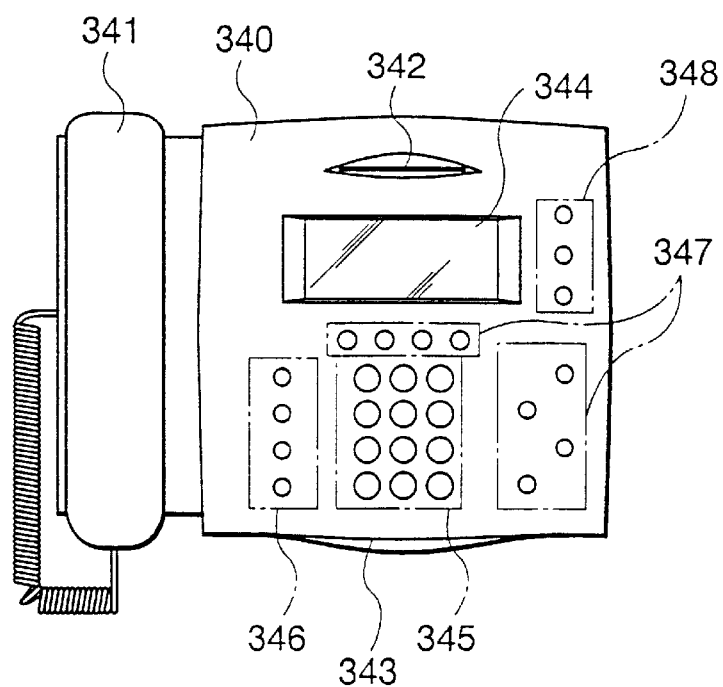
FIG. 3 is a top view of the telephone showing the layout of keys and other components.
Figure 4:
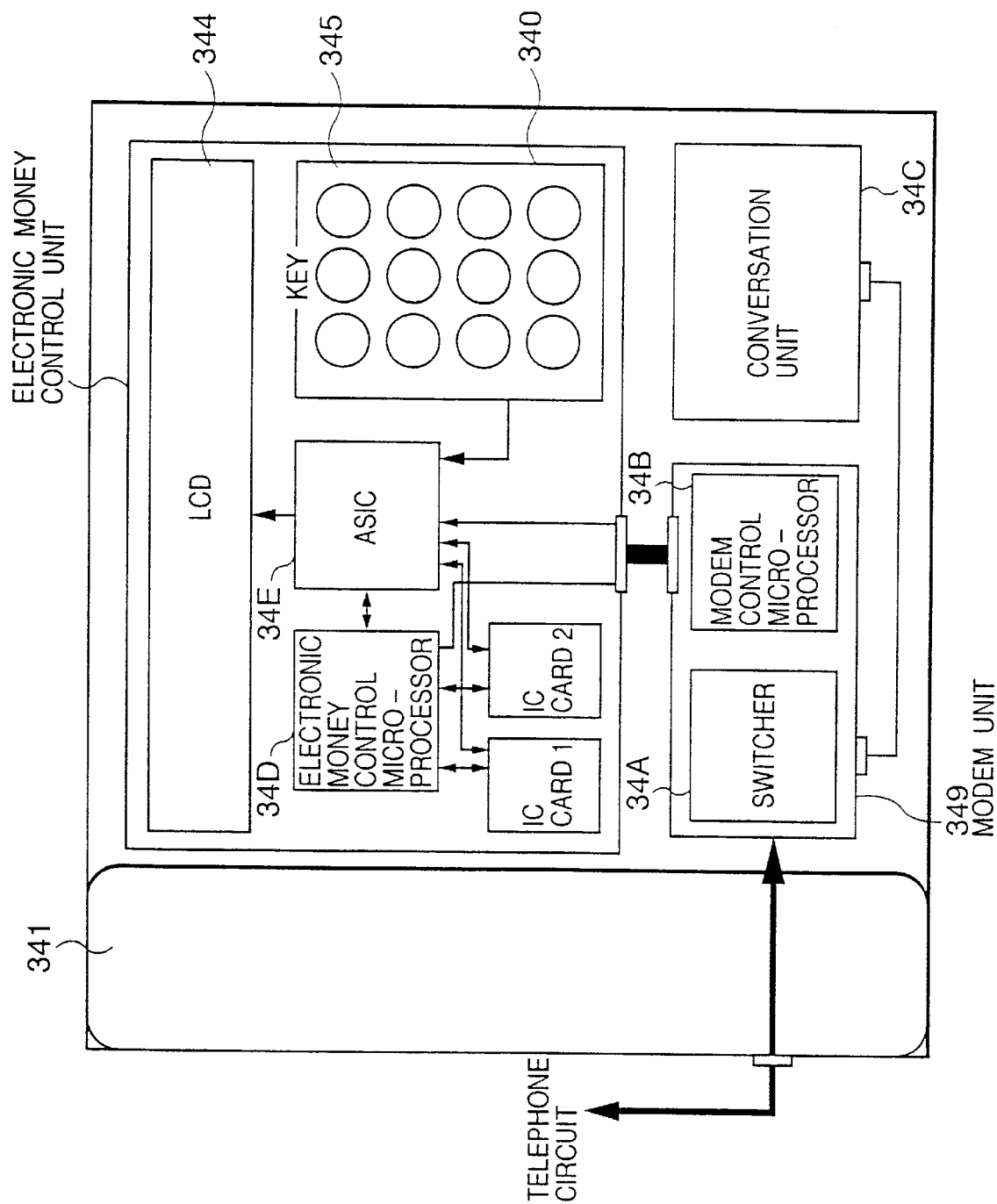
FIG. 4 is a functional block diagram of the telephone.

Next, an embodiment of the telephone used in the foregoing electronic money transaction system will be explained with reference to FIG. 2 showing the external view of the telephone based on an embodiment of this invention, FIG. 3 showing the top layout of the telephone, and FIG. 4 showing the functional blocks of the telephone based on an embodiment of this invention. Throughout these figures, reference numeral 340 denotes a telephone main body, 341 is a handset, 342 and 343 are IC card inlets, 345 is a ten-key set, 346 is a set of telephone function keys, 347 is another set of function keys, 348 is a set of control keys, 349 is a modem unit, 34A is a switcher, 34B is a modem control microprocessor, 34C is an talk unit, 34D is an electronic money control microprocessor, and 34E is a routine function IC. Remaining components are identical to those shown in FIG. 1.

The telephone 34 of this embodiment is made up of the main body 340 and handset 341 as shown in FIG. 2 and FIG. 3. Disposed on the top of the telephone main body 340 are the card inlets 342 and 343 in which two pieces of IC cards 10 are inserted, the display window 344, the ten-key set 345 used to dial a telephone number and enter an amount of electronic money transaction, etc., the telephone function keys 346, the other function keys 347, and the control keys 348 used to choose an item of menu.

The two card inlets 342 and 343 are located at the top rear position and the front side of the main body 340, respectively, so that one IC card is inserted vertically and another IC card is inserted horizontally. The card inlet 342 at the top rear position of the main body 340 is easier to access and is intended for the frequent use of a single IC card. IC cards inserted in these card inlets are coupled to the IC card reader/writers (not shown) so that electronic money is transferred between these IC cards, or an IC card inserted in one of the card inlets is linked to other IC card through the telephone line for transferring electronic money between these IC cards.

Among the various keys on the top of the main body 340, the ten-key set 345 and telephone function keys 346 are located at the center, and the function keys 347 and control keys 348 used for electronic money transfer are located on the right-hand side of the telephone keys. This key layout reduces the erroneous operation by the user.

As shown in FIG. 4, the telephone 34 of this embodiment includes insides the main body 340 the modem unit 349 consisting of the switcher 34A and modem control microprocessor 34B for implementing the transmission and reception of the signals of speech and electronic money transfer information over the telephone line, and functional circuitries including the talk unit 34C, electronic money control microprocessor 34D and routine function IC 34E for display control and the like.

Next, various examples of operation for carrying out the electronic money transfer by use of the telephone arranged as described above will be explained.

Figure 5:
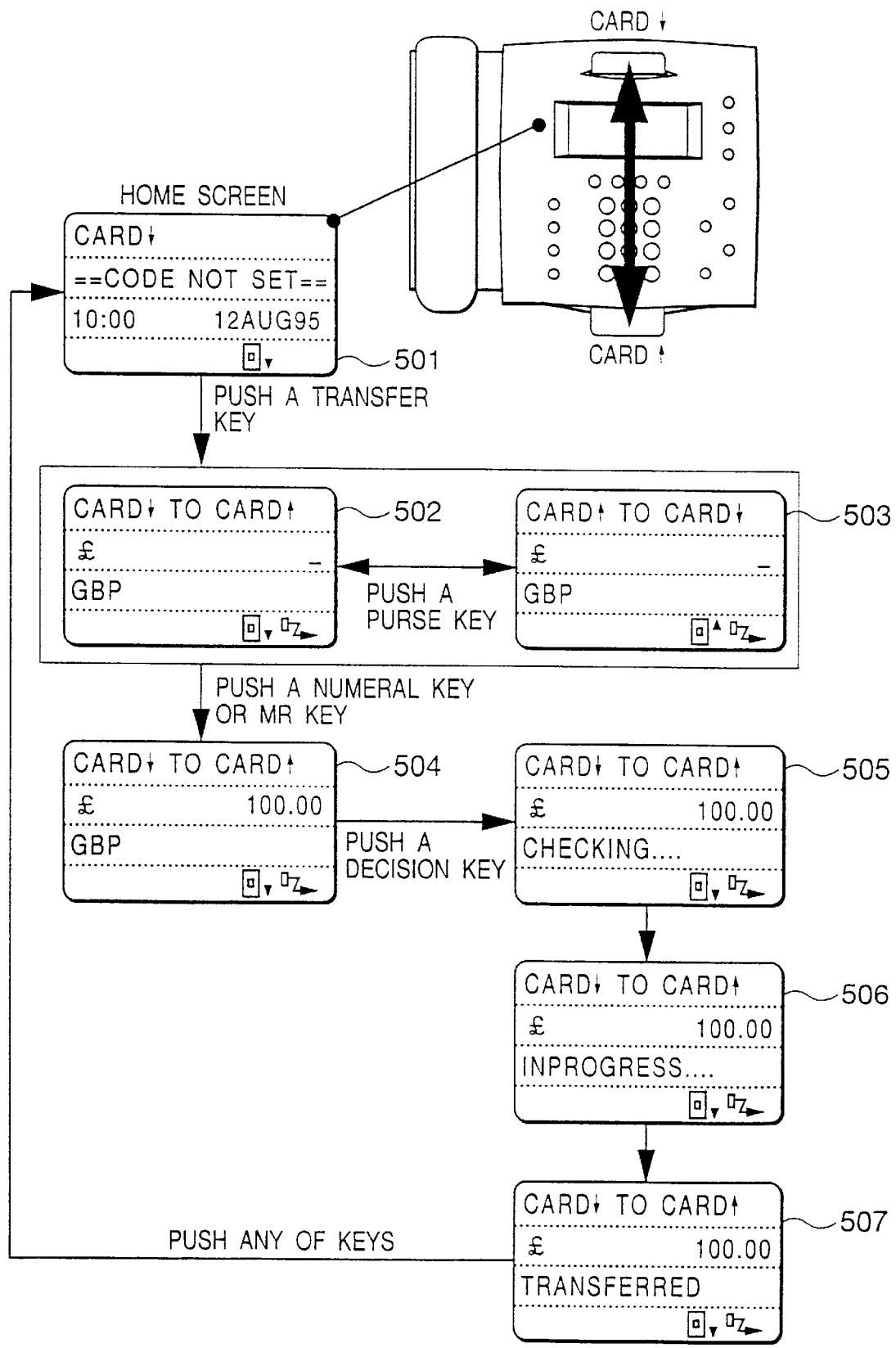
FIG. 5 is a flowchart used to explain the operation of electronic money transfer between two pieces of IC cards coupled to the telephone.
Figure 12:
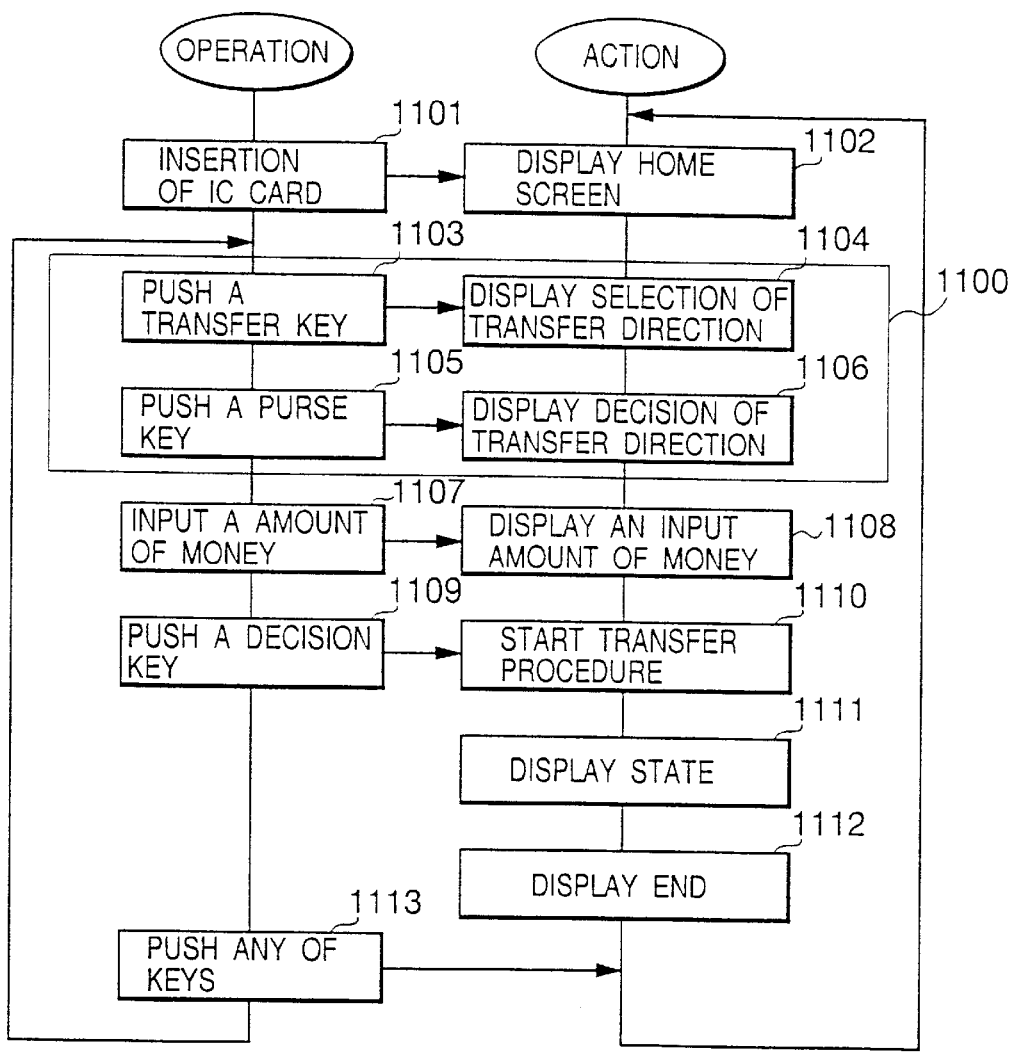
FIG. 12 is a flowchart used to explain the operation of electronic money transfer between two pieces of IC cards coupled to the telephone.

FIG. 5 and FIG. 12 are flowcharts used to explain the operation for carrying out the electronic money transfer between two pieces of IC cards coupled to the telephone 34 of the foregoing embodiment. The following explanation is focused entirely to the electronic money transfer, and the operation for dealing with passwords, which are entered by the user following the insertion of IC cards in the card inlets 342 and 343 for unlocking the IC cards, is omitted.

(1) Initially, the user inserts two pieces of IC cards to be subjected to electronic money transfer in the card inlets 342 and 343 of the telephone in non-busy state: (step 1101 of FIG. 12), and a home screen 501 appears on the display window 344: (step 1102).

(2) With the home screen 501 being displayed, the user pushes the Transfer key out of the function keys 347: (step 1103), and a screen used to specify the direction of money transfer as shown by 502 and 503 in FIG. 5 appears: (step 1104). The screen of this example indicates a top IC card set in the top card inlet by the up-pointing arrow and a front IC card set in the front card inlet by the down-pointing arrow. The screen 502 indicates the money transfer from the top IC card to the front IC card, while the screen 503 indicates the opposite money transfer. The user can switch between these screens 502 and 503 by pushing the Purse key among the function keys 347: (step 1105). Accordingly, the operation of step 1100, i.e., pushing of the Transfer key and Purse key among the function key 347 in steps 1103 and 1105, allows the user to set easily and arbitrarily the transfer direction between two pieces of IC cards inserted in different card inlets.

(3) Following the selection of one of the screens 502 and 503 (in this example, the screen 502 for money transfer from the top IC card to the front IC card is selected), the user operates the ten-key set 345 or pushes the MR key for memory reading to enter the amount of money to be transferred: (step 1107). The example of FIG. 5 shows the entry of £100, and the entered £100 is displayed in screen 504: (step 1108).

(4) The user who has checked the entered amount pushes the Decision key: (step 1109). Then, the electronic money control microprocessor 34D in the telephone 34 starts the process of electronic money transfer from the top IC card to the front IC card coupled to the telephone: (step 1110). During the processing, the display varies from screen 505 to screen 506: (step 1111), and settles with screen 507 at the end of processing: (step 1112). Obviously, both IC cards have their balances revised accordingly.

(5) With the screen 507 being displayed, when the user pushes any key among the function key 347: (step 1113), the state with the home screen 501 displayed is restored, and the user can terminate the money transfer operation, or can proceed to the insertion of another IC card for further electronic money transfer.

The foregoing electronic money transfer between two pieces of IC cards is applicable, for example, to the transfer of money between the husband and wife or between the parent and child at home, and to financial affairs between individuals.

Next, the operation of electronic money transfer between two IC cards by use of two telephones 34 of the foregoing embodiment will be explained with reference to the flowcharts of FIG. 6, FIG. 7, FIG. 13 and FIG. 14.

Figure 6:
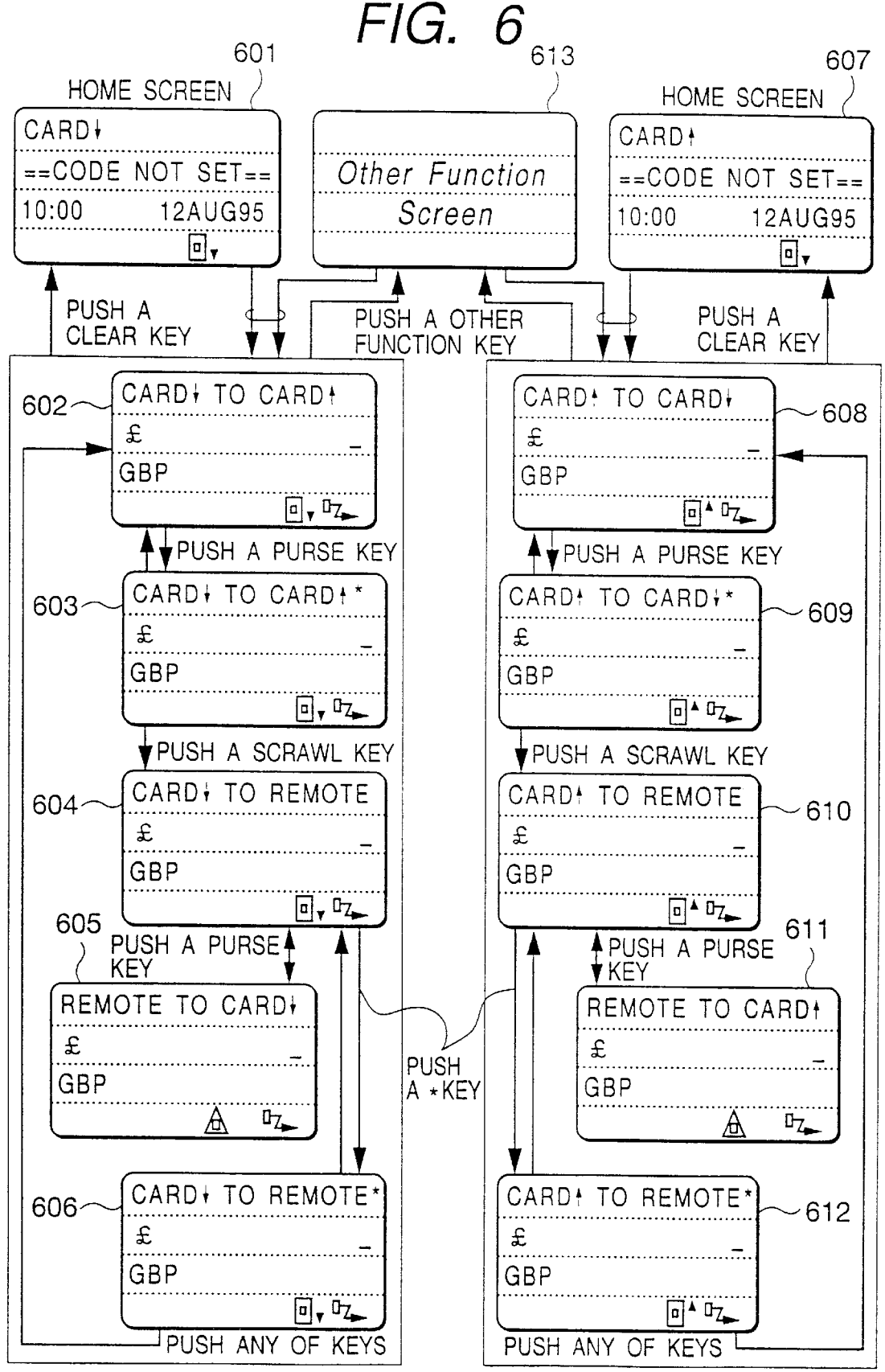
FIG. 6 is a flowchart used to explain the operation of electronic money transfer between an IC card coupled to the telephone and other IC card coupled to other telephone.
Figure 7:
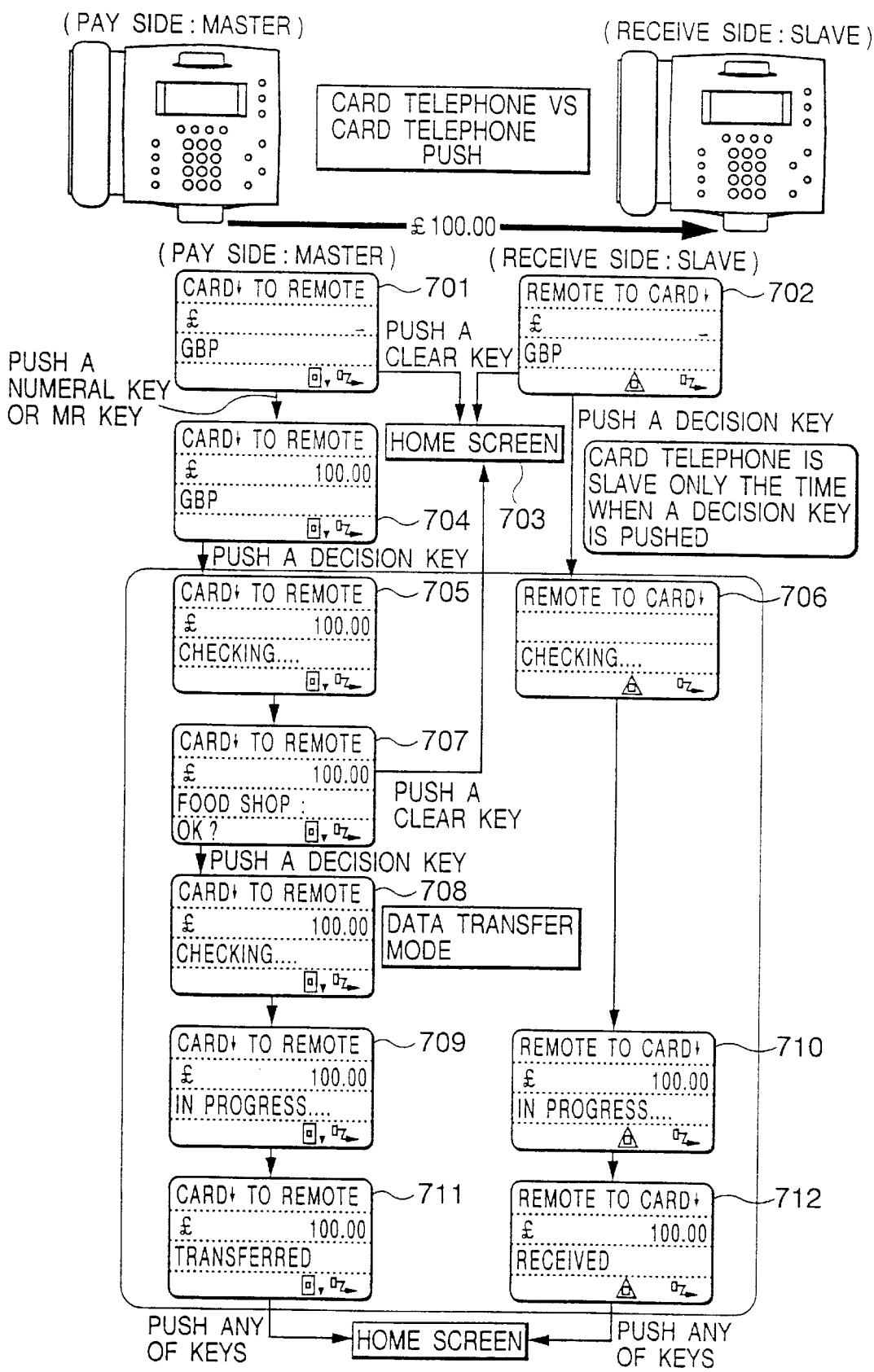
FIG. 7 is a flowchart used to explain the operation of electronic money transfer between an IC card coupled to the telephone and another IC card coupled to another telephone.
Figure 14:
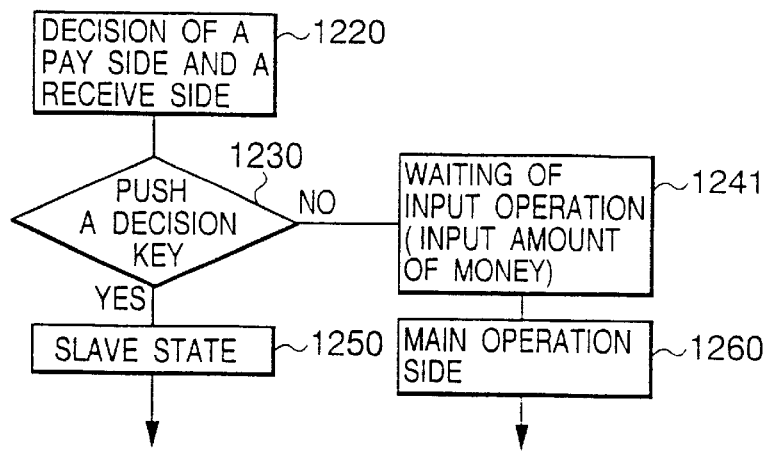
FIG. 14 is a flowchart used to explain the determination of the master/slave relation between the two telephones in the transaction operation shown in FIG. 13.
Figure 13:
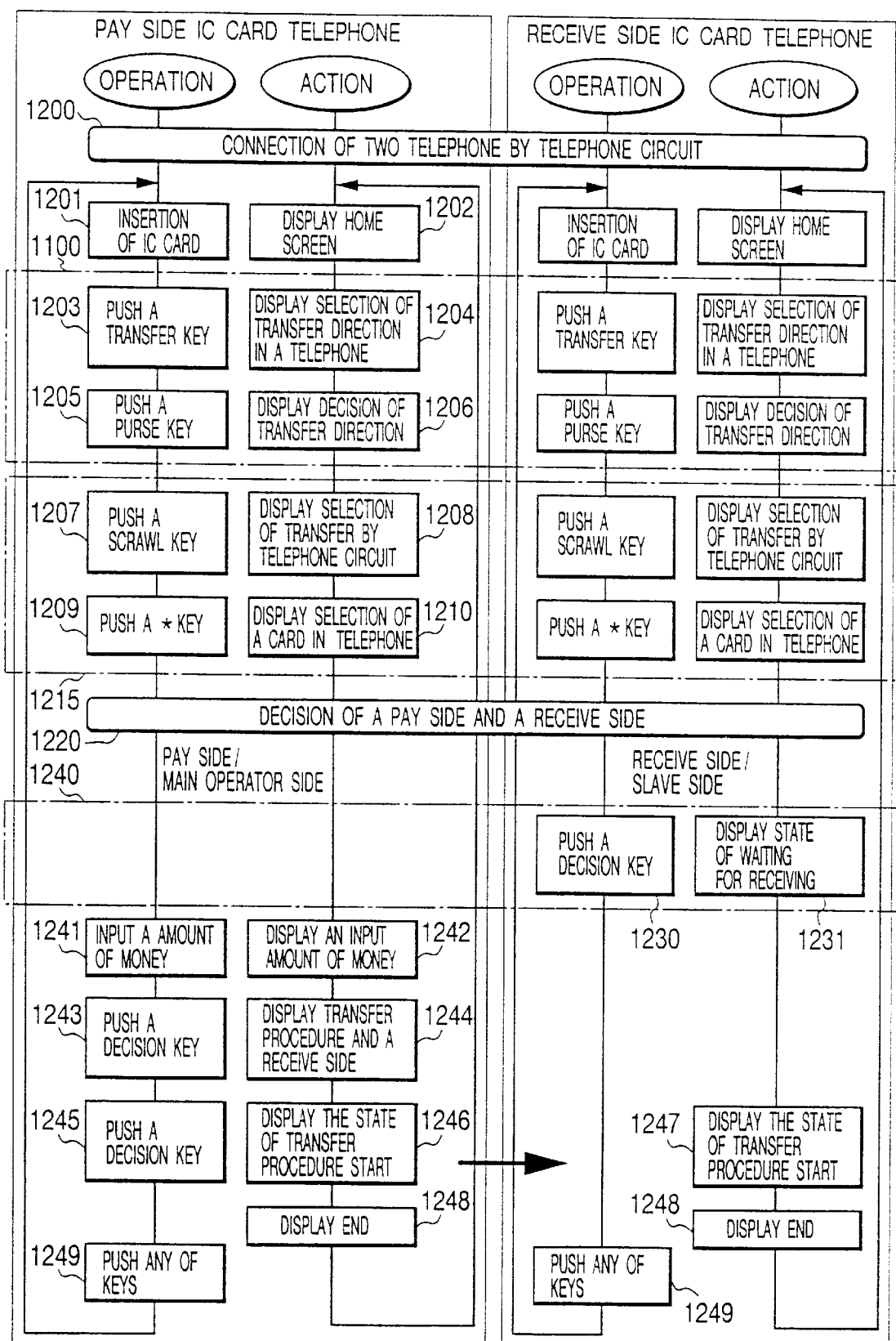
FIG. 13 is a flowchart used to explain the operation of electronic money transfer between an IC card coupled to the telephone and another IC card coupled to another telephone.

FIG. 6 explains, in connection with displayed screens, the operation of specifying the paying party and receiving party among two IC card users at the linked telephones and specifying an IC card in one of two card inlets of each telephone for carrying out the money transfer. Screens 601–606 are displayed on one telephone, and screens 607–612 are displayed on the other telephone. The selected IC card of each telephone is indicated by mark "*" at the upper right corner of the screen. FIG. 7 explains the subsequent money transfer operation. FIG. 13 and FIG. 14 are the overall and partial flowcharts, respectively.

(1) After the two telephones are linked: (step 1200), each user inserts an IC card to the card inlet: (step 1201), and home screens 601 and 607 appear on the respective telephones: (step 1202).

(2) The paying user pushes the Transfer key among the function key 347: (step 1203), and screens 602 and 608 for carrying out the money transfer between two IC cards on the same telephone appear: (step 1204). The user further pushes the Purse key: (step 1205), and screens 603 and 609 that are the same as the screens 502 and 503 explained previously appear: (step 1206).

(3) Next, the paying user, who intends to transfer electronic money to other IC card on the other telephone, pushes the Scroll key: (step 1207), and screens 604–606 and screens 610–612 of money transfer over the telephone line appear: (step 1208). These screens are used to designate the paying pary and receiving party and specify the IC cards used for transaction: (step 1215). The user can set these items by pushing the Purse key and "*" key: (steps 1205,1209).

Following the designation of the paying and receiving parties and the transaction IC cards, the money transfer operation shown in FIG. 7 starts. Otherwise, during the above operations, the user is allowed to return to the state with the home screens 601 and 607 by pushing the Clear key, or go to the state with screen 613 for other function by pushing a relevant Function key.

The example shown in FIG. 7 and FIG. 16 is the transfer of electronic money from the IC card coupled to the payer's telephone to the IC card coupled to the receiver's telephone carried out by the user at the payer's telephone as the master which takes the lead of operation.

(1) After the payer's telephone and receiver's telephone are linked through the telephone line by the action taken by either party: (step 1200), the operation shown in FIG. 6 proceeds, and the payer's telephone has on its display window 344 a display of screen 701 indicative of it to be the paying party and the receiver's telephone has a display of screen 702 indicative of it to be the receiving party: (step 1220).

(2) If the user at the receiver's telephone pushes the Decision key among the function key 347: (step 1230), that telephone becomes the slave and displays a screen 706: (step 1231). The payer's telephone is the master from now on to take the lead of money transfer. Namely, in the state with the paying party and receiving party designated: (step 1220), the leading telephone for money transfer is designated depending on whether or not the Decision key is pushed: (step 1230), as shown in FIG. 14. If the Decision key is pushed on one telephone, it becomes the slave and follows the operation taken by the master telephone, or otherwise if the entry of the amount of money transaction or the like proceeds instead of the pushing of Decision key, this telephone as the master leads the subsequent operation: (step 1260).

(3) The user at the payer's telephone having a display of screen 701 operates the ten-key set 345 or pushes the MR key for memory reading to enter the amount of money to be sent: (step 1241). The example of FIG. 7 shows the entry of £100, and the entered £100 is displayed in the screen 704: (step 1242).

(4) The user at the payer's telephone who has checked the entered amount pushes the Decision key: (step 1243). Then, the electronic money control microprocessor 34D in the telephone 34 starts the money transfer process with the receiver's telephone. It displays a screen 705, and thereafter receives the receiver's name, i.e., "Food Shop" in this example, of the receiver's telephone and displays a screen 707 on the display window 344: (step 1244).

(5) The user at the payer's telephone who has checked the displayed items pushes the Decision key: (step 1245). Then, the electronic money transfer proceeds, and during the processing, the display on the payer's telephone varies from screen 708 to screen 709: (step 1246), and settles with screen 711 at the end of processing: (step 1248). The receiver's telephone has its display varying to screen 710: (step 1247), and settles with screen 712 at the end of processing to complete the electronic money transfer process: (step 1248).

During the operation with the screen 701,702 or 707 displayed, if the Clear key is pushed, the state with a screen 703 which is identical to the home screen 501 of FIG. 5 is restored. At the end of processing with the screen 711 or 712 displayed, if any function key is pushed, the state with the screen 703 which is identical to the home screen 501 of FIG. 5 is restored.

The foregoing operation enables the transfer of electronic money over the telephone line, while protecting the IC card user from illegal draw out of money based on the designation of the leading (master) telephone (step 1240).

Figure 8:
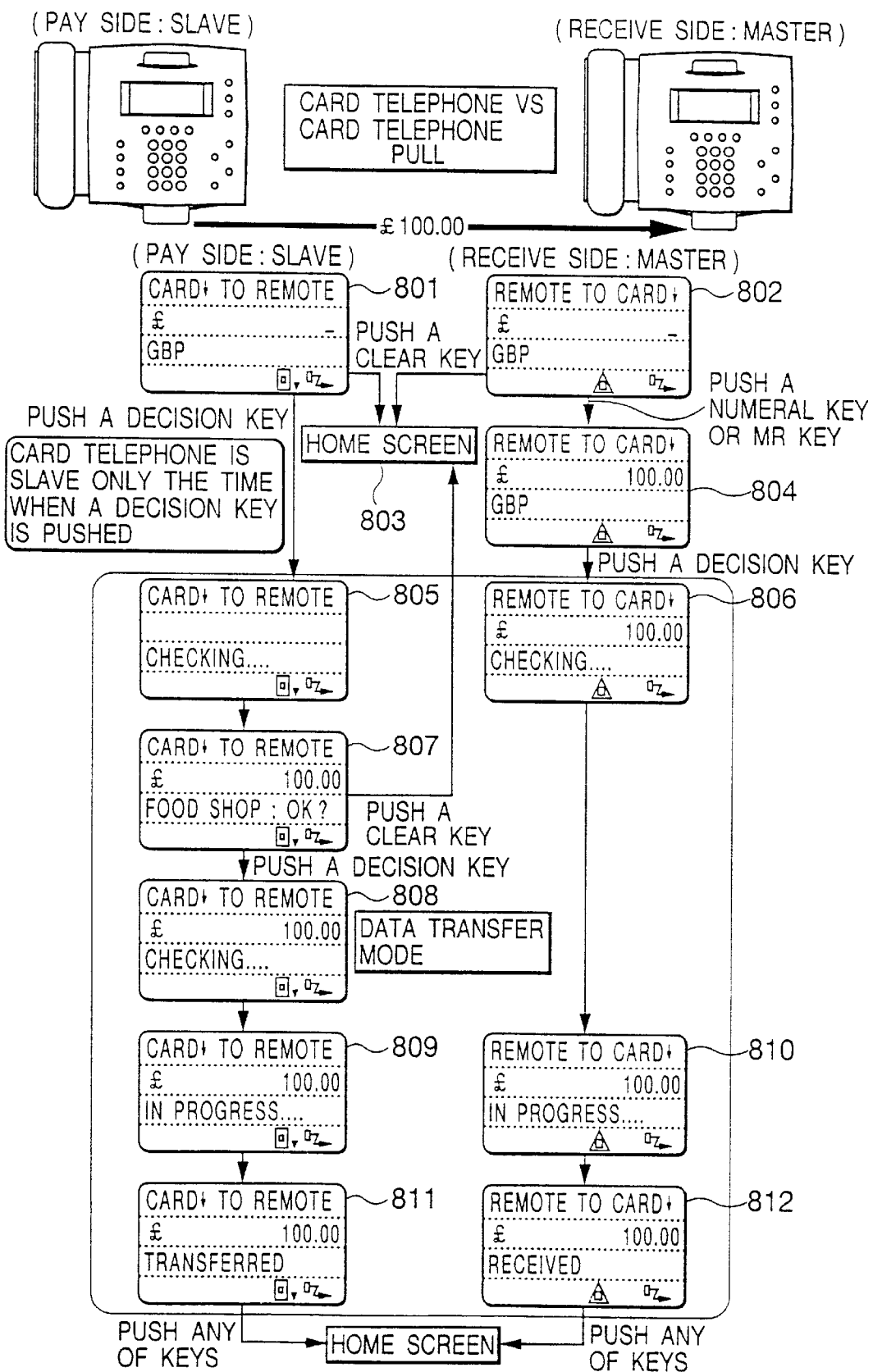
FIG. 8 is a flowchart used to explain another example of the operation of electronic money transfer between two pieces of IC cards.
Figure 15:
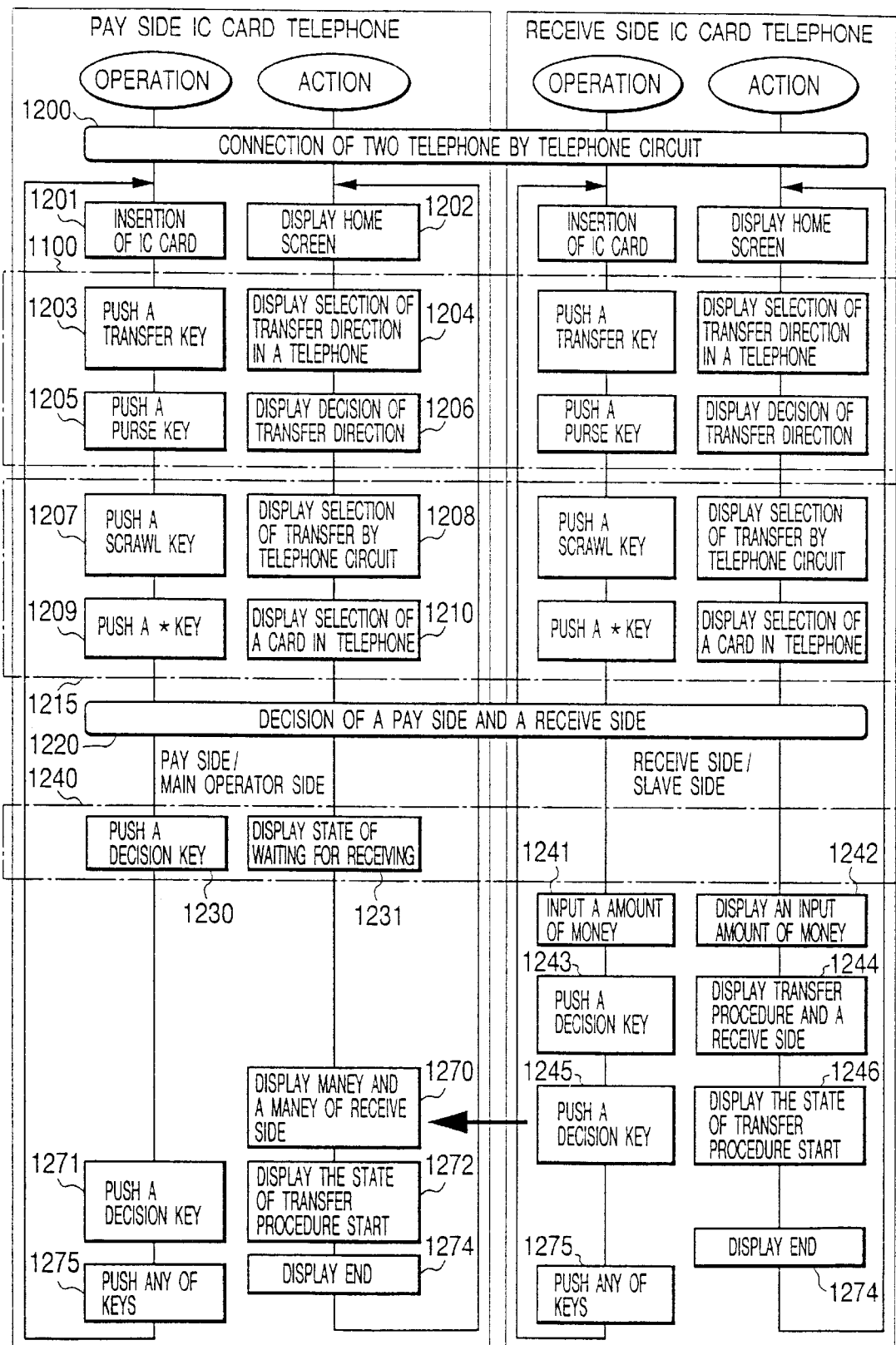
FIG. 15 is a flowchart used to explain the operation of electronic money transfer between an IC card coupled to the telephone and another IC card coupled to another telephone.

FIG. 8 and FIG. 15 show the operation of electronic money transfer between two IC cards coupled to two telephones 34, of which the receiver's telephone serves as the master to draw electronic money from the IC card coupled to the payer's telephone to the IC card coupled to it, as opposed to the preceding example shown in FIG. 7 in which the payer's telephone serves as the master to draw electronic money from the IC card coupled to the payer's telephone to the IC card coupled to it. The operation takes place following the operation explained previously on the flowchart of FIG. 6.

(1) After the payer's telephone and receiver's telephone are linked through the telephone line by the action taken by either party and both users talk to each other: (step 1200), the users insert thier IC cards in the card inlets of their telephones: (step 1201). Then, the operation shown in FIG. 6 takes place: (steps 1100, 1215), and the payer's telephone has on its display window 344 a display of screen 801 indicative of it to be the paying party and the receiver's telephone has a display of screen 802 indicative of it to be the receiving party: (step 1220).

(2) If the user at the payer's telephone pushes the Decision key among the function key 347: (step 1230), the telephone becomes the slave: (step 1250 in FIG. 15) and displays a screen 805: (step 1231) on its display window 344: (step 1231). The receiver's telephone becomes the master: (step 1260 in FIG. 14) to lead the subsequent money transfer operation.

(3) The user at the receiver's telephone having a display of screen 802 operates the ten-key set 345 or pushes the MR key for memory reading to enter the amount of money to be received: (step 1241). The example of FIG. 8 shows the entry of £100, and the entered £100 is displayed in the screen 804: (step 1242).

(4) The user at the receiver's telephone who has checked the entered amount pushes the Decision key: (step 1243). Then, the electronic money control microprocessor 34D in the telephone 34 starts the electronic money transfer process with the receiver's telephone. It displays a screen 806: (step 1244), and thereafter sends the amount of money to be received and the receiver's name, i.e., "Food Shop" in this example, to the payer's telephone: (step 1246).

(5) The payer's telephone displays a screen 807 including the amount and receiver's name received from the receiver's telephone on the display window 344: (step 1270). The user at the payer's telephone who has checked these items pushes the Decision key: (step 1271). Then, the money transfer process proceeds. During the processing, the display on the payer's telephone varies from screen 808 to screen 809: (step 1272), and settles with screen 811 at the end of processing: (step 1274). The receiver's telephone has its display varying to screen 810, and settles with screen 812 at the end of processing: (step 1274) to complete the electronic money transfer process.

During the operation with the screen 801,802 or 807 displayed, if the Clear key is pushed, the state with a screen 803 which is identical to the home screen 501 of FIG. 5 is restored. At the end of processing with the screen 811 or 812 displayed, if any function key is pushed, the state with the screen 803 which is identical to the home screen 501 of FIG. 5 is restored.

The foregoing operation enables the transfer of electronic money over the telephone line, while protecting the IC card user from illegal draw out of money based on the designation of the leading (master) telephone (step 1240). In the case of electronic money transfer led by the receiver's telephone, the user at the payer's telephone as the slave has enhanced security of money transfer based on the interlock procedure with the Decision key (step 1271) which is pushed upon checking the amount of money to be sent and receiver's name.

Figure 9:
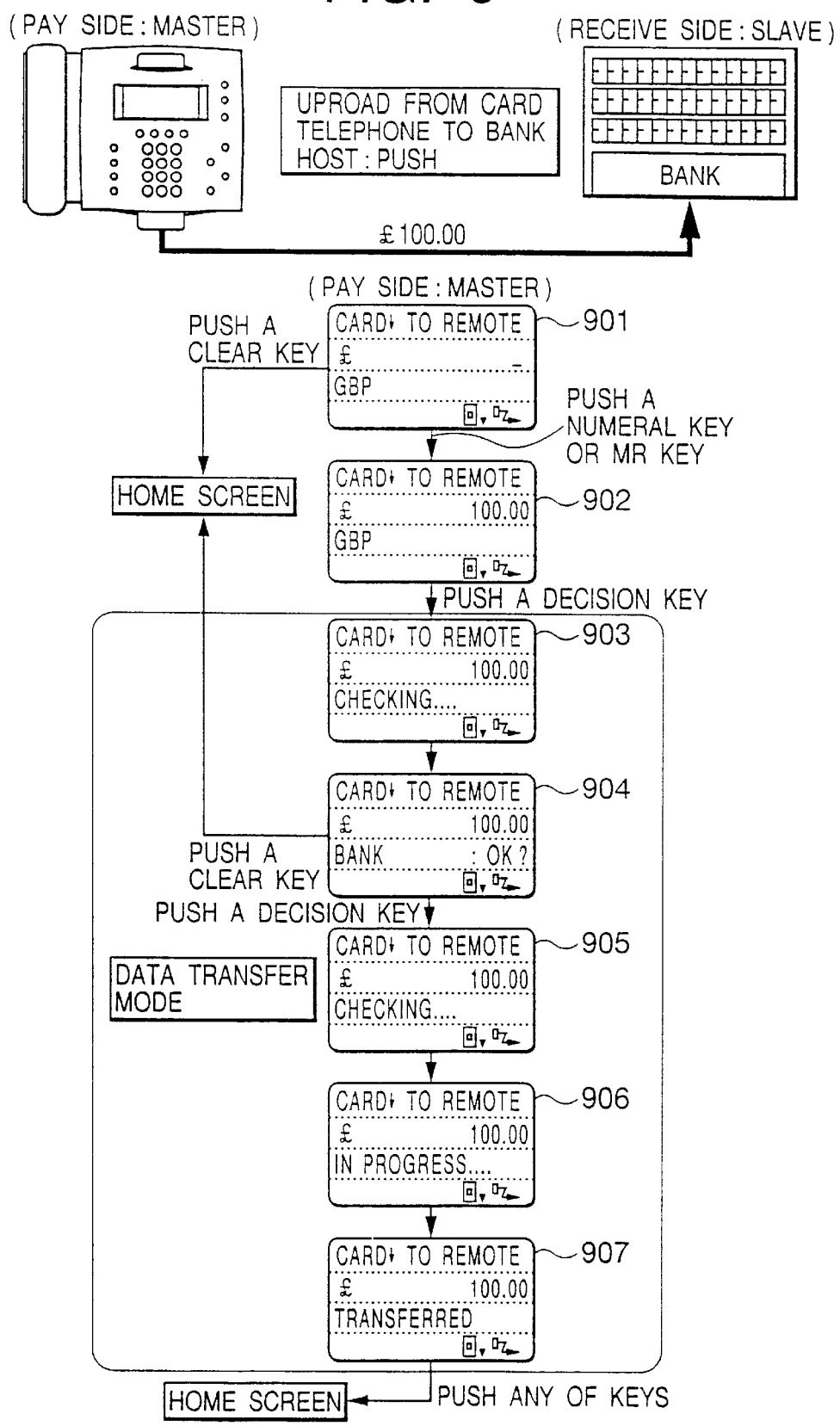
FIG. 9 is a flowchart used to explain the operation of electronic money transfer from the telephone to a bank.

FIG. 9 shows the operation of electronic money transfer from the telephone to the host bank. The operation proceeds after the telephone is linked to the electronic money transaction control terminal 16 of the bank branch system 1 explained in connection with FIG. 1 and on completion of the operation explained on the flowchart of FIG. 6.

(1) At the end of the operation of FIG. 6, the payer's telephone has on its display window 344 a display of screen 901 indicative of it to be the paying party.

(2) The user at the payer's telephone having a display of screen 901 operates the ten-key set 345 or pushes the MR key for memory reading to enter the amount of money to be sent. The example of FIG. 9 shows the entry of £100, and the entered £100 is displayed in the screen 902.

(3) The user at the payer's telephone who has checked the entered amount pushes the Decision key. Then, the electronic money control microprocessor 34D in the telephone 34 starts the electronic money transfer process with the electronic money transaction control terminal 16 of the receiving bank branch system 1. It displays a screen 903, receives the receiver's name, i.e., "Bank" in this example, and displays a screen 904 on the display window 344.

(4) The user at the payer's telephone who has checked the entered items reen pushes the Decision key. Then, the money transfer process proceeds. During the processing, the display on the payer's telephone varies from screen 905 to screen 906, and settles with screen 907 at the end of processing to complete the electronic money transfer process.

During the operation with the screen 901 or 904 displayed, if the Clear key is pushed, the home screen 501 of FIG. 5 is restored. At the end of processing with the screen 907 displayed, if any function key is pushed, the home screen 501 of FIG. 5 is restored.

On the part of the bank branch system 1, the received electronic money is stored temporarily in a specific IC card in the value box 15, and it will be put into the payer's bank account or other person's bank account in response to the payer's instruction.

Figure 10:
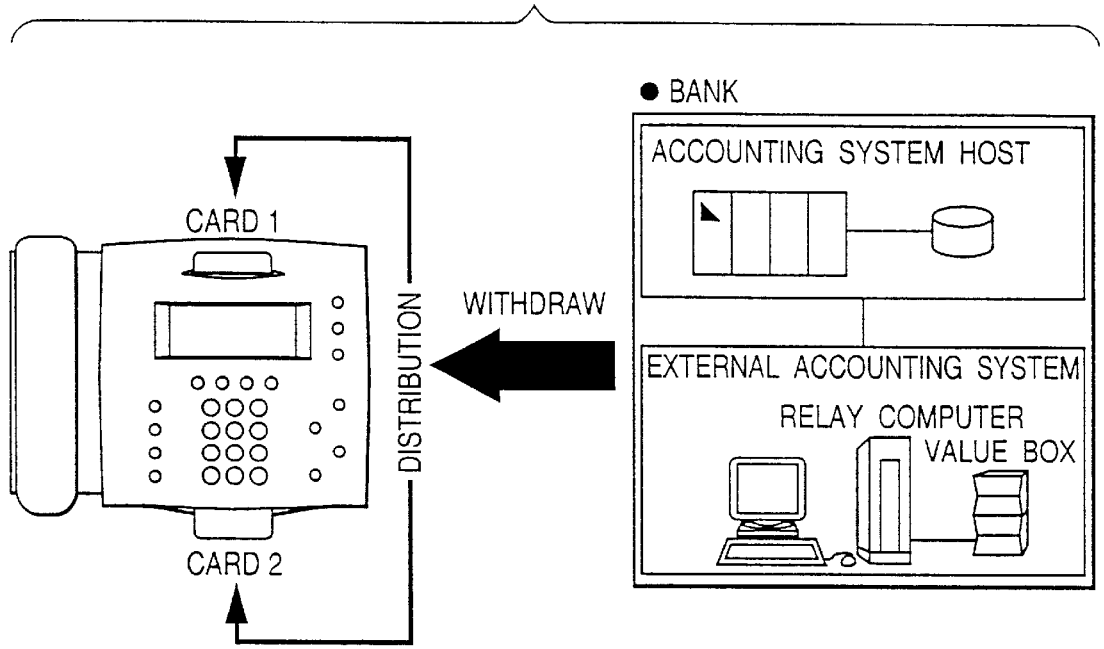
FIG. 10 is a diagram used to explain the operation of drawing electronic money from the deposit of bank account by use of the telephone.

It is also possible for the user of the telephone to draw money in form of electronic money from one's bank account and put it into one's IC card coupled to the telephone as opposed to the preceding example. FIG. 10 shows the operation of drawing electronic money from the user's bank account into two IC cards dividely at once by using the telephone 34 with the ability of handling two IC cards.

Figure 11:
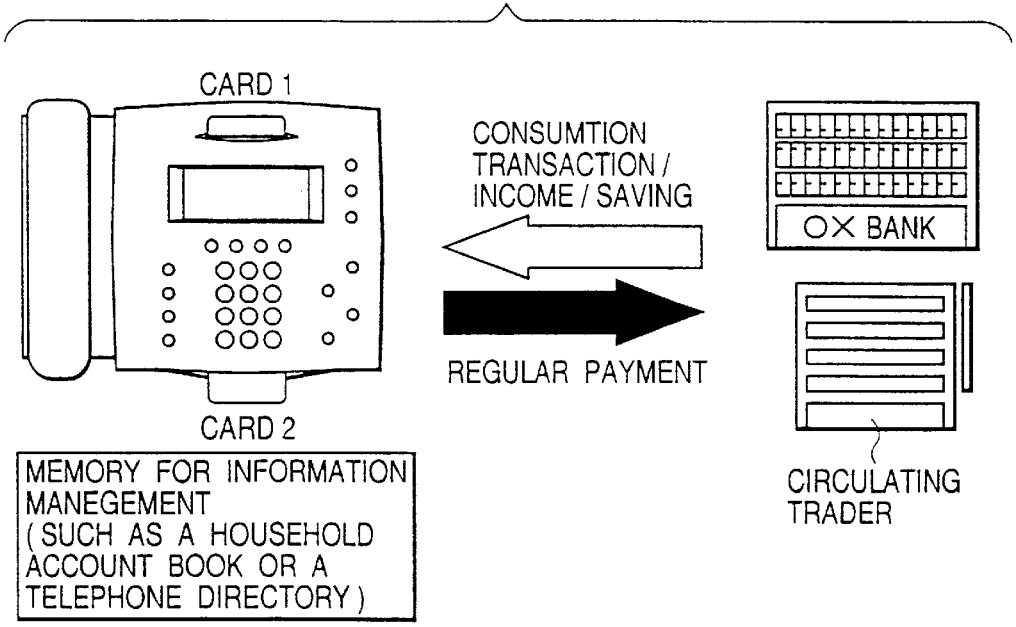
FIG. 11 is a diagram used to explain the use of IC cards as various information handling mediums.

Besides the use of IC cards for the electronic money transfer as described above, IC cards can also be used as various other information handling mediums. For example, the IC card can be used to log the income, deposit of bank account, IC card access, etc. by recording transactions with the banks and retail stores sequentially, as shown in FIG. 11. IC cards can also be used for the regular payment to the banks and retail dealers based on the recording of their telephone numbers in it. In the example shown in FIG. 11, one IC card CARD1 for the electronic money transfer and another IC card CARD2 for the logging of household affairs and recording of telephone numbers are used in combination.

Besides the electronic money transfer between an IC card coupled to a telephone having two IC card reader/writers and other IC card linked to it through the communication line as described above, it is further possible for the inventive telephone to have three or more IC card reader/writers and for the the inventive operation method to link the telephone to more than one communication line.

As a variant arrangement of the inventive telephone, each card inlet may be provided with an indicator which indicates in colors the operational state of the IC card, e.g., busy state of communication.

The inventive telephone enables the electronic money transfer between IC cards, e.g., the person-to-person, person-to-bank and person-to-retailer transactions, based on the telephone communication function, while protecting the IC card user from illegal withdrawal of money.

The inventive telephone has card inlets which allow easy access for the insertion and ejection of IC cards and has a convenient telephone top layout which allows easy distinction between the telephone function and electronic money transfer function.

As described above, the present invention offers the telephone for handling electronic money and the method of operation of the telephone, with the provision of card inlets which allow easy access for the insertion and ejection of IC cards and a convenient telephone top layout which allows easy distinction between the telephone function and electronic money transfer function, by which it becomes possible to carry out the person-to-person, person-to-bank and person-to-retailer transactions of electronic money, while protecting the IC card user from illegal withdrawal of money.

What is claimed is:

1. A telephone used for an electronic money transaction system for transferring electronic money between money cards which can store electronic money, said telephone comprises;

a main body including electronic money control unit, a modem unit and a talk unit, a handset connected with said main body through a cable, a display part, operation keys and two inlets of the electronic money cards which are equipped on a case of the main body, and said display part has a first display screen by use of which transfer direction of electronic money between two electronic money cards inserted in said two card inlets is determined and a second display screen by use of which transfer direction of electronic money between one of the electronic money cards inserted in said one of said two card inlets and an electronic money card connected through a communication network is determined;

said operation keys having a transfer key to display said first display screen, a scroll key to display said second display screen, a purse key to determine said transfer direction of electronic money between two electronic money cards displayed on said first and second display screen and a ten-key to input amount of the electronic money, and said electronic money control part has means for starting transfer of an electronic money in accordance with a transfer direction displayed on said first display screen when said purse key is pushed in a state that said first display screen is displayed, for displaying that the telephone used for the electronic money transaction system is under slave state and that the telephone is waiting a response from a communication partner when said purse key is pushed before input of the amount of the electronic money, for settling the telephone as master and keeping leadership for transfer proceeding received thereafter when said purse key is pushed after input of amount of the electronic money, in a state that said second display screen is displayed, selecting one of the cards inserted in said inlets of said plurality of electronic money card read/writers for transmitting side or for receiving side.

2. A method of operation of a telephone which is used for an electronic money transaction system for transferring electronic money between money cards which can store electronic money, the telephone includes a main body including electronic money control unit having two electronic money card read/writers and an electronic money control part, a modem unit, a talk unit, and a display part, operation keys including a ten-key to input amount of electronic money and two inlets of the electronic money cards which are equipped on a case of the main body; said method comprises:

a first step for displaying a first display screen by use of which transfer direction of electronic money between two electronic money cards inserted in said two card inlets on said display part, for receiving change of the transfer direction of electric money, and for starting transfer of electronic money in accordance with the transfer direction of electronic money settled on said first display screen, a second step for displaying a second display screen by which transfer direction of electronic money between one of electronic money cards inserted in said one of said two card inlets and an electronic money card connected through communication network, and for receiving change of the transfer direction of electric money, a third step for displaying the state that the telephone is under slave state on the second display screen, and for waiting response from a communication partner when instruction of money transfer is received before input of amount of the electronic money by said ten-key, and a fourth step for change the state the telephone used for the electronic transaction system to master state so as to maintain priority of transfer processing of after reception of operation thereafter when transfer instruction is performed after input of amount of electronic money by said ten-key.

3. A method of operation of a telephone according to claim 2, which comprises, when the telephone is under master state, a step for starting transfer processing with said communication partner, displaying information of the communication partner on said display screen, and starting transfer of electronic money by another transfer instruction thereof when the telephone is a pay side telephone;

a step of transmitting information of the payment to the communication partner and waiting the payment of the communication partner when the telephone is a pay side telephone; and when the telephone is under slave state, a step of displaying the information of payment transmitted from the said communication partner on the display screen and starting transfer of the electronic money by transfer instruction when the telephone is a pay side telephone, and a step of receiving the payment the electronic money from the communication partner when the telephone is a receive side telephone.

* * * * *